F3-290 SEARCH ROOM

July 25, 1950 H. L. McDOUGAL 2,516,330

DEVICE FOR MEASURING THE LIQUID CONTENT OF PARTIALLY FILLED TRANSPARENT CONTAINERS

Filed May 22, 1947 3 Sheets-Sheet 1

INVENTOR.
Harold L. McDougal
BY
Evans + McCoy
ATTORNEYS

SEARCH ROOM

July 25, 1950 H. L. McDOUGAL 2,516,330
DEVICE FOR MEASURING THE LIQUID CONTENT OF
PARTIALLY FILLED TRANSPARENT CONTAINERS
Filed May 22, 1947 3 Sheets-Sheet 2

INVENTOR.
Harold L. McDougal
BY
Evans + McCoy
ATTORNEYS

SEARCH ROOM

INVENTOR.
Harold L. McDougal
BY
Evans & McCoy
ATTORNEYS

SEARCH ROOM

Patented July 25, 1950 2,516,330

UNITED STATES PATENT OFFICE 2,516,330

DEVICE FOR MEASURING THE LIQUID CONTENT OF PARTIALLY FILLED TRANSPARENT CONTAINERS

Harold L. McDougal, Lakewood, Ohio

Application May 22, 1947, Serial No. 749,774

12 Claims. (Cl. 73—290)

This invention relates to a device for measuring the liquid content of partially filled transparent containers such as liquor bottles.

Liquor is commonly dispensed in bars, restaurants and similar establishments in small, measured drinks which are commonly referred to as "drams," "jiggers" or "shots." For convenience such drinks will be referred to herein as "shots." The bottles from which the shots are poured are of a size such that they contain a large number of shots. Since numerous brands of liquor are frequently dispensed from the same bar, the stock of liquor on hand at any given time may include a considerable number of partially filled bottles, and because of this it is difficult to take an accurate invoice of the stock on hand. Since the liquors so dispensed are quite expensive, it is highly desirable to frequently take an invoice of the stock of liquor on hand in order to check the volume dispensed against cash receipts.

The present invention has for its object to provide a simple and convenient device for quickly ascertaining the quantity of liquid contained in partially filled bottles.

A further object of the invention is to provide a device which will accurately measure the contents of bottles of various sizes.

More particularly it is an object of the invention to provide a device which gauges the bottle and automatically brings to reading position alongside the bottle, a scale that is calibrated to indicate the volume of liquid in the bottle.

It is also an object of the invention to provide a device which is adapted to receive interchangeable scales calibrated to different units of volume, so that the device can be readily adapted to properly indicate the liquid content of bottles in terms of the number of shots of the size being dispensed.

An additional object of the invention is to provide a device of the character described which requires a minimum amount of manipulation.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figures 1, 2, 3, 4:
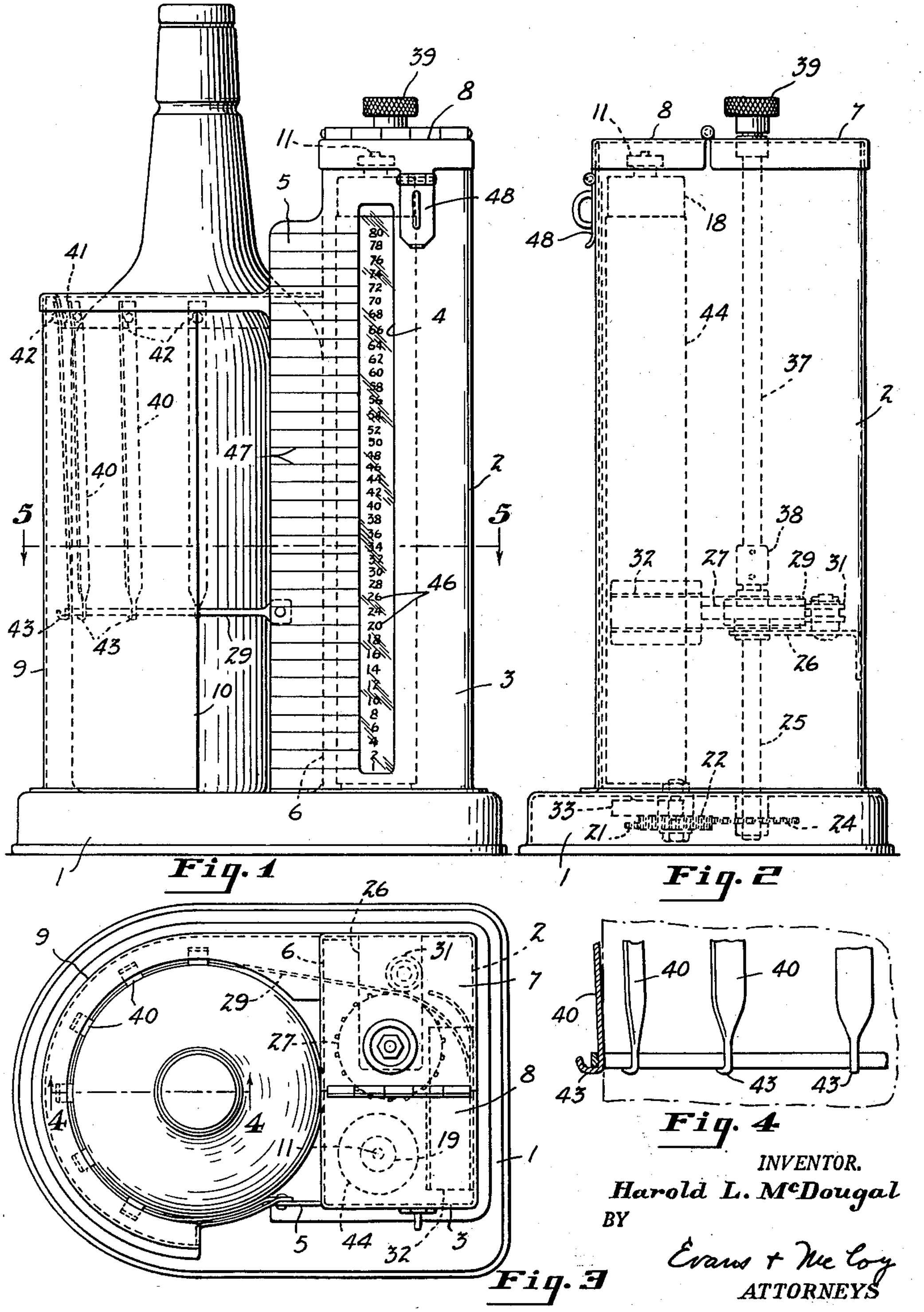
Figure 1 is a side elevation of a liquid measuring device embodying the invention.
Fig. 2 is an end elevation of the device shown in Fig. 1.
Fig. 3 is a top plan view of the device.
Fig. 4 is a fragmentary section taken on the line indicated at 4—4 in Fig. 3.
Figure 5:
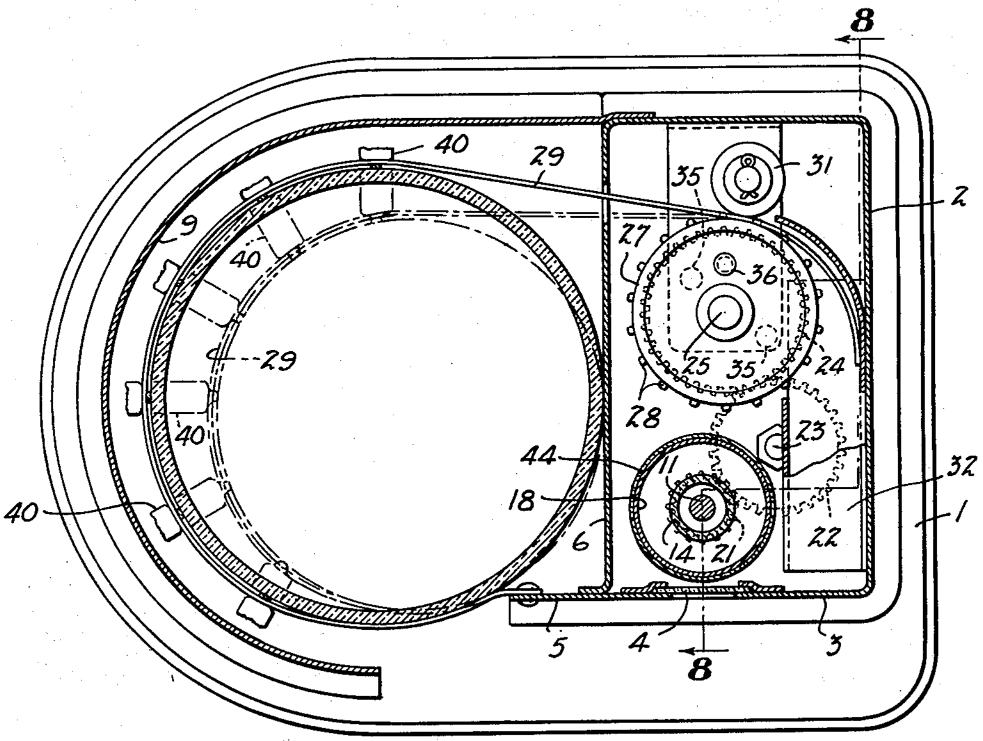
Fig. 5 is a horizontal section taken on the line indicated at 5—5 in Fig. 1.

As illustrated in the accompanying drawings, the measuring device of the present invention has a flat, hollow base 1 upon one end of which is mounted a vertical housing 2 provided with a front wall 3 that has a vertical window 4 extending substantially the full height thereof. The front wall 3 has an inner edge portion 5 that extends past the inner side wall 6 of the housing 2 and which cooperates with the flat vertical wall 6 to position a bottle B whose contents is to be measured. The housing 2 has a cover 7, the front portion of which is in the form of a hinged lid 8, and a curved vertical wall 9 extends around the bottle receiving portion of the base 1 to provide an open top bottle receiving compartment. The wall 9 is attached to the housing 2 at the rear thereof and has a vertically disposed free edge 10 at the front of the device which is spaced from the extension 5 of the front wall 3 of the housing to provide a vertical window through which a portion of the bottle B is exposed to show the level of the liquid therein. Means is provided for gauging a bottle placed in the bottle receiving compartment and for automatically bringing into registry with the window 4 a scale that is calibrated to indicate the volumetric content of the bottle.

Within the forward portion of the compartment 2 there is mounted a vertical shaft 11 which is journaled in upper and lower bearings 12 and 13 mounted in a tubular standard 14 that is fixed to the base 1. A collar 15 attached to the lower end of the shaft 11 engages the under side of the bearing 13 and a flanged collar 16 at the upper end of the shaft rests upon the upper bearing 12 to hold the shaft 11 against endwise movements. The flanged collar 16 carries an upwardly projecting pin 17 which serves to position a detachable scale carrying drum 18 which has a closed end resting upon the top of the collar 16 and which, at its lower end, fits over a fixed collar 20 surrounding the lower end of the tubular standard 14. The collar 15 at the lower end of the cap 11 has a pinion 21 attached thereto that meshes with an idler gear 22 carried by a stub shaft 23 that is mounted in the base 1, and the gear 22 meshes with a gear 24 fixed to the lower end of the vertical shaft 25 that is journaled in the base 1 and in a bracket 26 secured to a wall of the housing 2 intermediate the top and bottom thereof.

Immediately above the bracket 26 a sprocket 27 is attached to the shaft 25. The sprocket 27 has a cylindrical periphery that is provided with regularly spaced radially projecting pins 28. A tape 29 is anchored at one end to the inner edge of the front housing wall 5 and is provided adjacent its opposite end with spaced perforations 30 which are adapted to receive the pins 28 of the sprocket. The tape 29 is held against the peripheral face of the sprocket 27 by means of a grooved roller 31 mounted on the bracket 26, the roller 31 having its groove disposed to receive the pins 28 and having cylindrical edge portions which press the opposite edges of the tape against the periphery of the sprocket 27. The free end of the tape is received in a guideway 32 attached to a side wall of the housing 2 and the tape is acted upon by a spring 33 that is mounted on the lower end of the shaft 11. The spring 33 is in the form of a flat coil spring having its inner end anchored to the collar 15 and its outer end anchored to a pin 34 attached to the base 1. The coil spring 33 acting through the pinion 21 and gears 22 and 24, exerts a torsional force on the sprocket 27 which tends to draw the tape into the housing 2. The rotative movement of the sprocket 27 is limited by pins 35 attached to the bracket 26 which are engaged by a pin 36 attached to the sprocket 27. The pins 35 and 36 are so located that the movement of the tape into the housing 2 is limited to a point where the portion of the tape within the bottle receiving compartment is contracted only slightly beyond the position assumed by the tape when in engagement with the smallest bottle for which the device is designed.

The shaft 25 may be provided with an extension 37 which is attached to the upper end of the shaft 25 by means of a coupling 38 and which extends through the cover 7 of the housing. The upper end of the extension 37 has a knob 38 attached thereto so that the sprocket 27 may be rotated manually when desired to assist in properly positioning the tape against the periphery of a bottle.

The tape 29 is preferably supported in such a manner that it will be expanded automatically upon insertion of a bottle into the bottle compartment. As best shown in Figs. 1 and 4, a series of spaced suspension straps 40 are provided for supporting the tape 29. The straps 40 are suspended from an angle-shaped bar 41 attached to the upper edge of the wall 9, the bar 41 having a downwardly projecting flange inside the wall 9 to which the upper ends of the strap 40 are secured by suitable means such as rivets 42. The lower ends of the straps 40 are provided with narrow hook portions 43 of substantially round cross section which are disposed upon the interior of the band 29. The band 29 is freely slidable in the hooks 43 and the straps 40 are adapted to have angular movements about the rivets 42 which provide pivotal connections between the upper ends of the straps and the bar 41.

Figure 6:
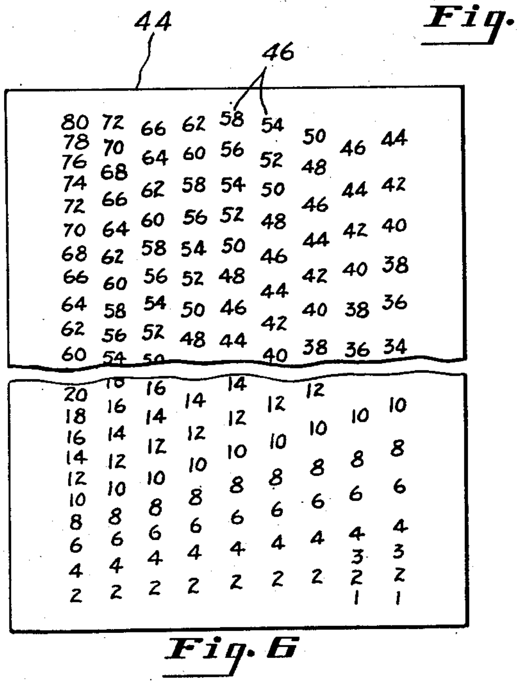
Figs. 6 and 7 show scale charts provided with spaced vertical columns for indicating the volumetric contents of various size bottles, the scales of Fig. 6 being calibrated to indicate volume in terms of one unit of measure and the scales of Fig. 7 being calibrated to indicate volume in terms of a larger unit of measure.

When a bottle is inserted into the bottle compartment, the bottom of the bottle engages the straps 40 and as the bottom of the bottle approaches the band 29 an outward thrust is exerted upon the band through the straps 40 to expand the same sufficiently to allow the bottle to pass through the band into engagement with the base 1. The tension of the spring 33 acting upon the band draws the band tightly against the periphery of the bottle and draws the bottle against the vertical wall 6 and the forward edge of the wall 5. The expansion of the tape to receive the bottle imparts a turning movement to the sprocket 27 and this movement is multiplied by the gears 24, 22 and 21 and transmitted to the shaft 11 which carries the drum 18. The drum 18 carries a scale chart 44 such as shown in Fig. 6 of the drawings, which is provided with a series of vertical columns 45 each graduated to show the number of units of volume of liquid contained in a bottle of given diameter for any level of the liquid in the bottle.

Figure 7:
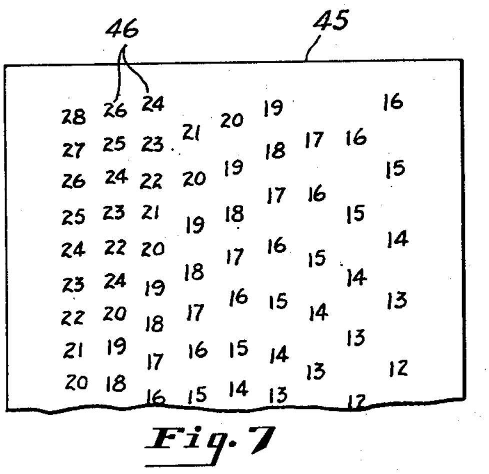
Figure 8:
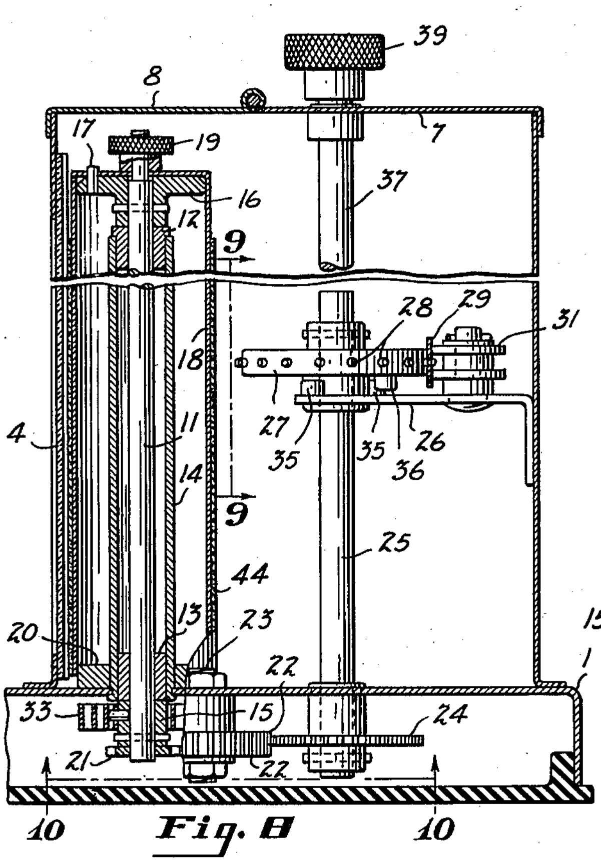
Fig. 8 is a vertical section taken on the line indicated at 8—8 in Fig. 5.
Figure 9:
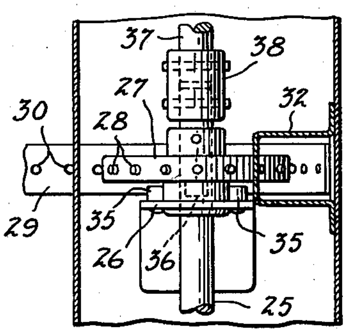
Fig. 9 is a fragmentary vertical section taken on the line indicated at 9—9 in Fig. 8.
Figure 10:
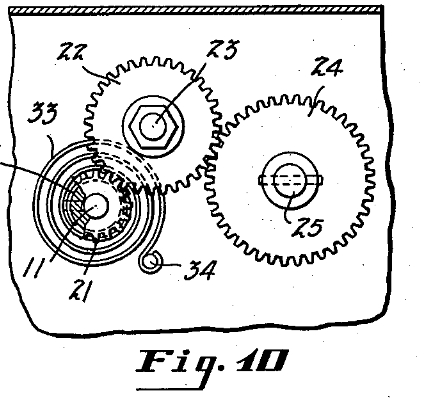
Fig. 10 is a horizontal section taken as indicated at 10—10 in Fig. 8.

The scales 45 may be graduated to indicate cubic inches or fluid ounces if desired. However, when the device is used for measuring a quantity of liquor in a bottle, it is convenient to have the scales 45 calibrated to indicate the number of shots remaining in the bottle. Since the volume of liquor in a shot differs in various establishments, it is desirable that a number of drums 18 be provided carrying charts with scales calibrated to different units of volume. For example, in Fig. 6 a chart is shown in which all of the scales 45 are calibrated to show the content of bottles of a series of sizes in terms of single unit of volume. Fig. 7 shows a similar chart 47 having scales calibrated to a larger unit of volume. For example, the chart shown in Fig. 6 may be calibrated to show the number of ¾ ounce shots remaining in a bottle of any one of the various sizes of bottles for which the scales are calibrated, while the chart shown in Fig. 7 may be calibrated to show the number of shots of a larger volume such as 1¼ ounces.

It is to be understood that the number of scales provided on each of the drums 18 may be varied considerably and that as many drums may be provided as is necessary to take care of as many different units of volume as desired.

As shown in Figs. 1 and 2, the cover 8 may be provided with a hasp 48 so that the lid 8 can be locked to prevent tampering with the indicating drum.

In order to facilitate the measurement of the height of the liquid in the bottle B, the front wall 5 between the inner edge thereof and the window 4 is provided with spaced horizontal lines 49 so that the graduation indicated on the scale 45 can be quickly and easily read.

Figure 11:
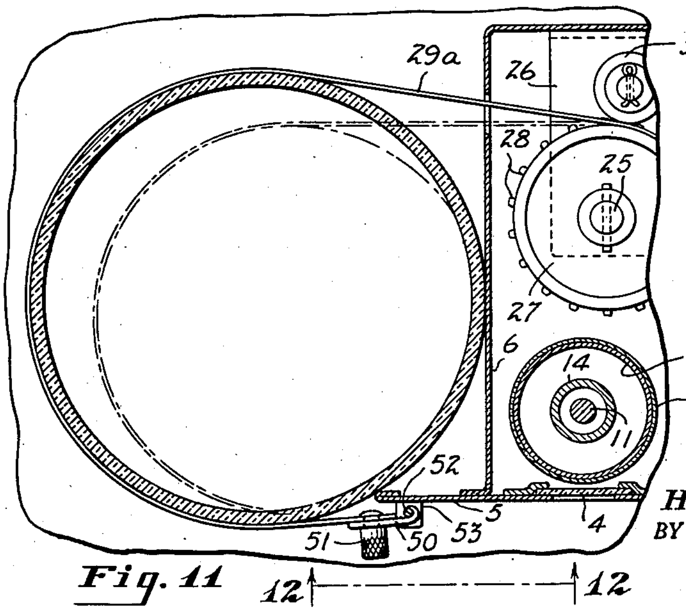
Fig. 11 is a sectional view corresponding to Fig. 8, showing a modified form of bottle gauging band.
Figure 12:
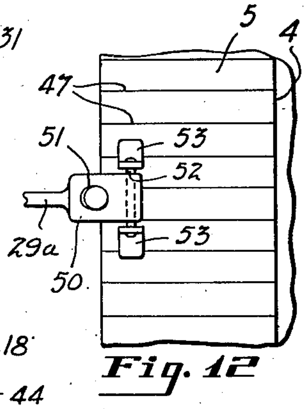
Fig. 12 is a fragmentary side elevation viewed as indicated at 12—12 in Fig. 11, and showing the detachable connection for an end of the bottle gauging band.

It is not essential that the tape 29 be so mounted that it is expanded automatically upon insertion of the bottle. In some instances it may be preferable to provide a tape which can be wrapped by hand about the bottle to be measured. In Figs. 11 and 12 of the drawings a modification is shown which is identical with that above described except that the tape supporting straps 40 and the wall 9 are omitted. In this case the tape 29*a* is free at the end opposite that engaged by the sprocket 28 so that it can be wrapped by

SEARCH ROOM hand about a bottle and secured to the front wall of the housing 2. The free end of the tape 29a carries a hook 50 and a handle 51, the hook 50 being engageable with a vertical pin 52 that is attached to the front wall 5 adjacent its inner edge by means of brackets 53.

In measuring the contents of a bottle with the device shown in Figs. 11 and 12, the operator places the bottle on the base 1 in engagement with the walls 5 and 6 as shown in Fig. 11, after which he grasps the handle 51 and pulls the tape around the bottle, hooking it into engagement with the pin 52. This movement of the tape will bring the proper scale into registry with the window 4 so that the volume of liquid in the bottle will be indicated upon the scale, as in the modification first described.

It is to be understood that variations and modifications of the specific devices herein shown and described for purposes of illustration, may be made without departing from the spirit of the invention.

What I claim is:

1. A device for measuring the contents of bottles of various sizes and similar cross sectional form comprising a bottle support, a horizontally movable upright member having a plurality of laterally spaced scale columns graduated to indicate the number of unit volumes of liquid in bottles of different horizontal dimensions, and a bottle gauging device having a movable portion engageable with the periphery of a bottle on said support and operably connected to said movable member to move the same to position the scale for the said bottle in reading position with respect to the bottle.

2. A device for measuring the contents of bottles of various sizes and similar cross sectional form comprising a bottle support, a vertically disposed rotatably mounted cylinder adjacent the bottle support and having circumferentially spaced scale columns graduated to indicate unit volumes of liquid in bottles of different horizontal dimensions, and a bottle gauging device having a movable portion engageable with the periphery of a bottle on said support and operably connected to said cylinder to impart turning movements thereto.

3. A device for measuring the contents of bottles of various sizes comprising a housing having a front wall provided with two laterally spaced vertical windows and having means for positioning a bottle behind one of said windows, a vertically disposed horizontally movable member behind the second window provided with a series of scale columns graduated to indicate the volumetric contents of bottles of different horizontal dimensions, and a bottle gauging device having a movable portion engageable with the periphery of a bottle on said support and operably connected to said member to move the same to position the scale for the said bottle into registry with the second window.

4. A device for measuring the contents of bottles of various sizes comprising a housing having a front wall provided with two laterally spaced vertical windows and having means for positioning a bottle behind one of said windows, said wall having spaced horizontal level indicating lines extending from window to window, a vertically disposed rotary cylinder behind the second window provided with circumferentially spaced vertical scales graduated to measure the contents of different sized bottles, and a bottle gauging device having a movable portion engageable with the periphery of the positioned bottle and operably connected to the cylinder to impart turning movements to the cylinder to register the scale for the said bottle with said second window.

5. A device for measuring the contents of bottles of various sizes comprising a housing having a front wall provided with two laterally spaced vertical windows and having means for positioning a bottle behind one of said windows, said wall having spaced horizontal level indicating lines extending from window to window, a vertically disposed rotary cylinder behind the second window provided with circumferentially spaced vertical scales graduated to measure the contents of different sized bottles, a spring connected to the cylinder to turn it in one direction, means for limiting the turning movement of the cylinder in said direction, and a bottle gauging device having a movable portion engageable with the periphery of the positioned bottle and operably connected to said cylinder to turn the same in opposition to said spring.

6. A device for measuring the contents of bottles of various sizes comprising a support having bottle positioning means thereon, a series of gauging scale columns for bottles of different horizontal dimensions each movable to a reading position alongside a bottle on said support, and a bottle gauging device having a movable portion engageable with the periphery of a bottle on said support and operably connected to said scale columns for positioning the scale for the bottle engaged by the gauging member in reading position.

7. A device for measuring the contents of bottles of various sizes and similar cross sectional form comprising a bottle supporting and positioning means including a supporting platform and a positioning standard, an upright member mounted for horizontal movement above said platform and having a plurality of vertically extending scales spaced apart predetermined distances each adapted to be moved to a reading position adjacent the bottle and each graduated to indicate units of volume for a bottle of predetermined size, and a bottle embracing band attached at one end to said standard and having its opposite end properly connected to said movable member to move the same a distance that varies with horizontal dimensions of the bottle to bring the scale for the bottle embraced by the band to reading position.

8. A device for measuring the contents of bottles of various sizes and similar cross sectional form comprising a bottle supporting and positioning means including a supporting platform and a positioning standard, an upright cylinder rotatably mounted adjacent said platform and having a series of circumferentially spaced vertical scales each graduated to indicate units of volume for a bottle of a predetermined size, and a bottle embracing band attached at one end to said standard and having its opposite end operably connected to said cylinder to turn the same to vary the positions of said scales.

9. A device for measuring the contents of bottles of various sizes and similar cross sectional form comprising a bottle supporting and positioning means including a supporting platform and a positioning standard, an upright cylinder rotatably mounted adjacent said platform and having a series of circumferentially spaced vertical scales each graduated to indicate units of volume for a bottle of a predetermined size, a spring connected to said cylinder to turn the same in one direction, means for limiting the turning movement of the cylinder in said direction, and a bottle embracing band attached at one end to said standard and operably connected at its opposite end to said cylinder to turn the same in opposition to its spring.

10. A device for measuring the contents of bottles of various sizes comprising a housing having a compartment in which a bottle may be supported in upright position, said housing having a vertical window through which the bottle may be viewed and a second vertical window spaced laterally from the first, a horizontally movable member having a series of upright scales spaced apart predetermined distances each adapted to register with said second window and each graduated to measure the liquid content of a bottle of a predetermined size, a bottle embracing band having one end attached to said housing and its opposite end operably connected to said movable member to move the same a distance that varies with horizontal dimensions of the bottle to register the scale for a bottle embraced by said band with said second window.

11. A device for measuring the contents of bottles of various sizes comprising a housing having a compartment in which a bottle may be supported in upright position, said housing having a vertical window through which the bottle may be viewed and a second vertical window spaced laterally from the first, a vertical shaft rotatably mounted alongside said bottle compartment and behind said second window, a cylinder detachably mounted on said shaft and having a series of circumferentially spaced measuring scales each adapted to register with said second window, a bottle embracing band anchored at one end to said housing, a rotatable member operably connected to the opposite end of said band and geared to said cylinder supporting shaft, a spring acting upon said band in a direction to contract the same upon a bottle, and means for expanding said band to permit insertion of a bottle.

12. A device for measuring the contents of bottles of various sizes comprising a housing having a front wall provided with two laterally spaced vertical windows and having means for positioning a bottle behind one of said windows, a vertically disposed horizontally movable member behind the second window provided with a series of scales graduated to indicate the volumetric contents of bottles of different sizes, a horizontally disposed bottle embracing band having one end attached to said front wall, a sprocket having a driving connection with the opposite end of said band and geared to said cylinder, a spring acting on said sprocket and tending to turn the same in a direction to contract said band, and a series of spaced flexible downwardly converging suspension members attached at their upper ends to said housing and at their lower ends to said band for guiding a bottle into said band.

HAROLD L. McDOUGAL.

REFERENCES CITED

The following references are of record in the file of this patent:

UNITED STATES PATENTS

| Number | Name | Date |
|---|---|---|
| 722,045 | Ream | Mar. 3, 1903 |
| 962,035 | Mackoy | June 21, 1910 |
| 2,010,534 | Collins | Aug. 6, 1935 |

FOREIGN PATENTS

| Number | Country | Date |
|---|---|---|
| 5,263 1905 | Great Britain | May 25, 1905 |